(12) United States Patent
Holmberg

(10) Patent No.: US 7,619,676 B2
(45) Date of Patent: *Nov. 17, 2009

(54) CAMERA LENS AND DISPLAY

(76) Inventor: Larry Holmberg, P.O. Box 63, Wascott, WI (US) 54890

( * ) Notice: Subject to any disclaimer, the term of this patent is extended or adjusted under 35 U.S.C. 154(b) by 1054 days.

This patent is subject to a terminal disclaimer.

(21) Appl. No.: 10/804,548

(22) Filed: Mar. 18, 2004

(65) Prior Publication Data

US 2004/0183942 A1    Sep. 23, 2004

Related U.S. Application Data

(60) Continuation of application No. 10/179,603, filed on Jun. 25, 2002, now Pat. No. 7,006,144, which is a division of application No. 09/264,587, filed on Mar. 8, 1999, now Pat. No. 6,556,245.

(51) Int. Cl.
  *H04N 5/225* (2006.01)
(52) U.S. Cl. .................................. 348/333.06
(58) Field of Classification Search ............ 348/207.99, 348/373–375, 333.01, 333.06, 157
  See application file for complete search history.

(56) References Cited

U.S. PATENT DOCUMENTS

| | | | |
|---|---|---|---|
| 0,521,761 A | 6/1894 | Day | |
| 0,899,639 A | 9/1908 | Vibber | |
| 1,480,147 A | 1/1924 | Fokko | |
| 2,450,466 A | 10/1948 | Carlson | |
| 2,814,118 A | 11/1957 | Evans et al. | |
| 3,427,102 A | 2/1969 | Wade | |
| 3,483,623 A | 12/1969 | Kruzell | |
| 3,785,261 A | 1/1974 | Ganteaume | |
| 4,027,414 A | 6/1977 | Felix | |
| 4,454,454 A | 6/1984 | Valentine | |
| 4,516,296 A | 5/1985 | Sherman | |
| 4,597,211 A | 7/1986 | Miles | |
| 4,606,629 A | 8/1986 | Hines et al. | |
| 4,640,258 A | 2/1987 | Penney et al. | |
| 4,643,159 A | 2/1987 | Ryan | |
| 4,777,352 A | 10/1988 | Moore | |
| 4,786,204 A | 11/1988 | Mayeda | |
| 4,786,966 A | 11/1988 | Hanson et al. | |
| 4,835,621 A * | 5/1989 | Black | 386/118 |
| 4,884,137 A | 11/1989 | Hanson et al. | |
| 4,890,128 A | 12/1989 | Kania | |
| 4,970,589 A | 11/1990 | Hanson et al. | |
| 4,974,575 A | 12/1990 | Mitchell | |
| 5,005,213 A | 4/1991 | Hanson et al. | |
| 5,026,158 A | 6/1991 | Golubic | |
| 5,161,310 A | 11/1992 | Stoot | |
| 5,200,827 A | 4/1993 | Hanson et al. | |

(Continued)

*Primary Examiner*—Tuan Ho
(74) *Attorney, Agent, or Firm*—Kinney & Lange, P.A.

(57) ABSTRACT

A camera having a lens and display. The camera also includes a main camera body and a display housing. The display housing has a front side and a back side. The display is encased in the back side of the display housing. The main camera body has a front end and a back end. The display housing is movably connected to the main camera body. The camera lens is of a given diameter and is encased in the front end of the main camera body. The display housing has first and second positions relative to the camera lens. In the first position, the display housing covers the lens and in the second position, the lens is exposed.

23 Claims, 18 Drawing Sheets

U.S. PATENT DOCUMENTS

| | | |
|---|---|---|
| 5,297,533 A | 3/1994 | Cook |
| 5,456,157 A | 10/1995 | Lougheed et al. |
| 5,491,507 A * | 2/1996 | Umezawa et al. ........ 348/14.02 |
| 5,531,149 A | 7/1996 | Schubert et al. |
| 5,611,324 A | 3/1997 | Kursinsky |
| 5,669,174 A | 9/1997 | Teetzel |
| 5,686,690 A | 11/1997 | Lougheed et al. |
| 5,687,910 A | 11/1997 | King |
| 5,711,104 A | 1/1998 | Schmitz |
| 5,739,859 A | 4/1998 | Hattori et al. |
| 5,834,676 A | 11/1998 | Elliott |
| 5,845,165 A | 12/1998 | McMahan |
| 5,944,041 A | 8/1999 | Kitchens |
| 6,029,643 A | 2/2000 | Golfieri |
| 6,070,355 A | 6/2000 | Day |
| 6,678,988 B1 | 1/2004 | Poff, Jr. |
| 7,390,130 B2 | 6/2008 | Soulvie |
| 2002/0078577 A1 | 6/2002 | Aldred |
| 2004/0016169 A1 | 1/2004 | Poff, Jr. |
| 2007/0031142 A1 | 2/2007 | Moody et al. |
| 2007/0081817 A1 | 4/2007 | Soulvie |
| 2007/0157502 A1 | 7/2007 | Holmberg |
| 2007/0157503 A1 | 7/2007 | Holmberg |
| 2008/0000465 A1 | 1/2008 | Holmberg |

* cited by examiner

CAMERA LENS AND DISPLAY

RELATED APPLICATION

This is a continuation application of U.S. patent application Ser. No. 10/179,603 filed Jun. 25, 2002 now U.S. Pat. No. 7,006,144, titled "Video Camera Recorder" and commonly assigned, the entire contents of which is incorporated herein by reference. In addition U.S. patent application Ser. No. 10/179,603 is a divisional application of U.S. patent application Ser. No. 09/264,587 filed Mar. 8, 1999 now U.S. Pat. No. 6,556,245, titled "Game Hunting Video Camera" and commonly assigned, the entire contents of which is also incorporated herein by reference.

TECHNICAL FILED OF INVENTION

This invention relates to a design of a video camera for recording game hunting. More specifically it relates to a video camera design that is mountable on a weapon so a hunter can records what he or she sees as he or she is hunting without the help of a third party and without the limitations of related art. Game hunting videos are very popular to the sportsman, both as an instruction tool and a way of capturing the hunt on film.

BACKGROUND OF INVENTION

A motion picture camera attached to the barrel of a rife is disclosed in the U.S. Pat. No. 3,427102 (Wade). This invention is cumbersome to use and is only designed to be attached to an elongated barrel of a firearm. Moreover, its use requires the operator to physically change the structure of the firearm.

A gun mounted video camera is disclosed in U.S. Pat. No. 4,835,621 (Black). This patent discloses a device that looks like a rifle but is really just a video camera recording device.

Video cameras mounted to firearms with head mounted video displays are disclosed in the following patents: U.S. Pat. No. 4,786,966 (Hanson), U.S. Pat. No. 4,884,137 (Hanson), U.S. Pat. No. 4,970,589 (Hanson), U.S. Pat. No. 5,005,213 (Hanson), U.S. Pat. No. 5,200,827 (Hanson), U.S. Pat. No. 5,711,104 (Schmitz). A similar invention is disclosed in U.S. Pat. No. 5,834,676 (Elliot). These patents relate to using a video camera to transmit a video signal to a head mounted video display for aiming purposes and are generally designed for military or police purposes not for recording game hunting.

The previous related art does not enable the use of a video camera for effectively recording game hunting under the conditions a game hunter is likely to encounter. The need for a simple and efficient way to record game hunting without hindering the hunt has long been felt. My present invention satisfies those needs.

BRIEF SUMMARY OF INVENTION

The above-mentioned problems with video camera systems and other problems are addressed by the present invention and will be understood by reading and studying the following specification.

In one embodiment, a camera is disclosed. The camera includes a display, a main camera body, a camera lens and a display housing. The display housing has a front side and a back side. The display is encased in the back side of the display housing. The main camera body has a front end and a back end. The display housing is movably connected to the main camera body. The camera lens is of a given diameter and is encased in the front end of the main camera body. The display housing has first and second positions relative to the camera lens. In the first position, the display housing covers the lens and in the second position, the lens is exposed.

In another embodiment, a camera comprises a main camera body, a lens a display housing and a display. The lens is received in the main camera body. The display housing is movably coupled to the main camera body to selectively cover and uncover the lens. The display is received in the display housing to display images received by the lens.

In further another embodiment, a camera lens and display apparatus is disclosed. The camera lens and display apparatus includes a lens, a display and a display housing. The lens is used to receive images and is received in a camera body. The display is used to display the received images. The display is received in the display housing. The display housing is movably coupled to the camera body to selectively cover and protect the lens and the display.

In yet another embodiment, a method of operating a camera is disclosed. The method comprising moving a display housing containing a display from a first position that covers a lens to a second position that uncovers the lens.

BRIEF DESCRIPTION OF DRAWINGS

The forgoing and other features and advantages will be apparent to those skilled in the art from the specification and the following illustrations of the preferred embodiments in which like reference numerals indicate like parts throughout the several views. Referring to the drawings.

DETAILED DESCRIPTION

Figure 1:
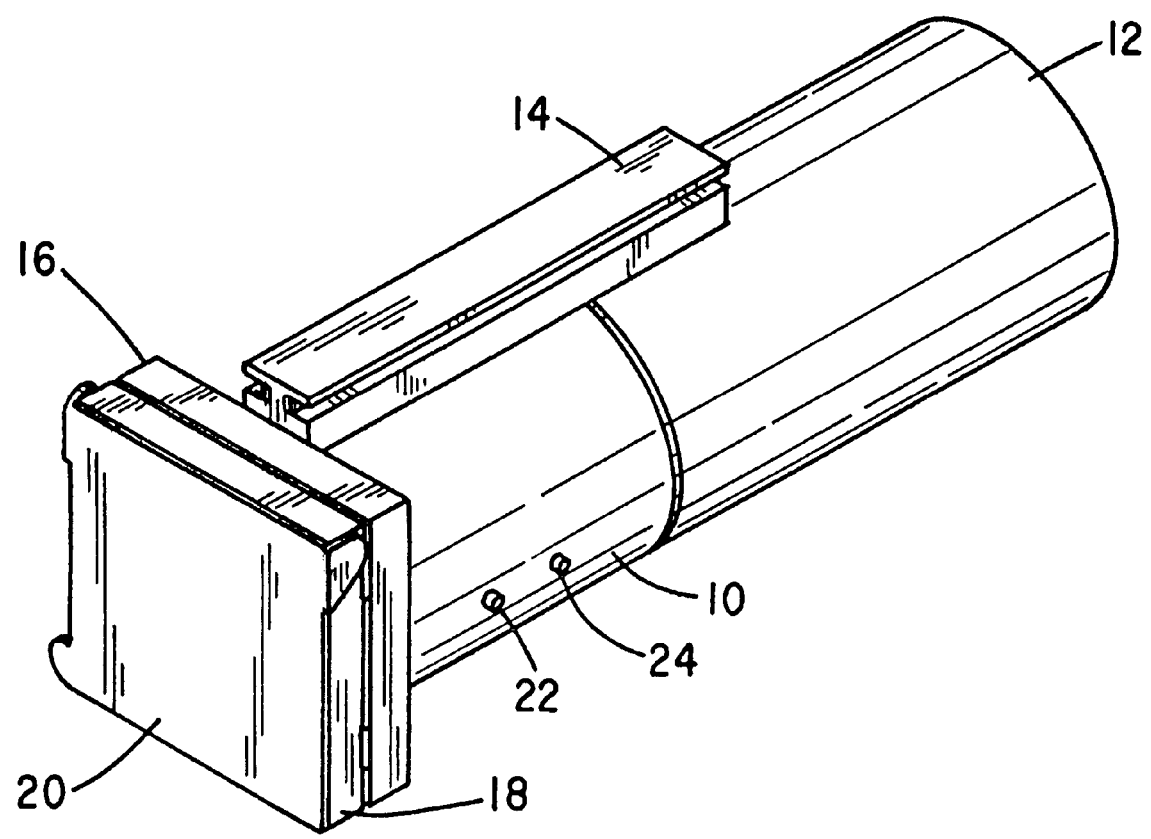
FIG. 1 is a perspective view of the first preferred embodiment of the game hunting video camera in its non-operational mode.
Figure 2:
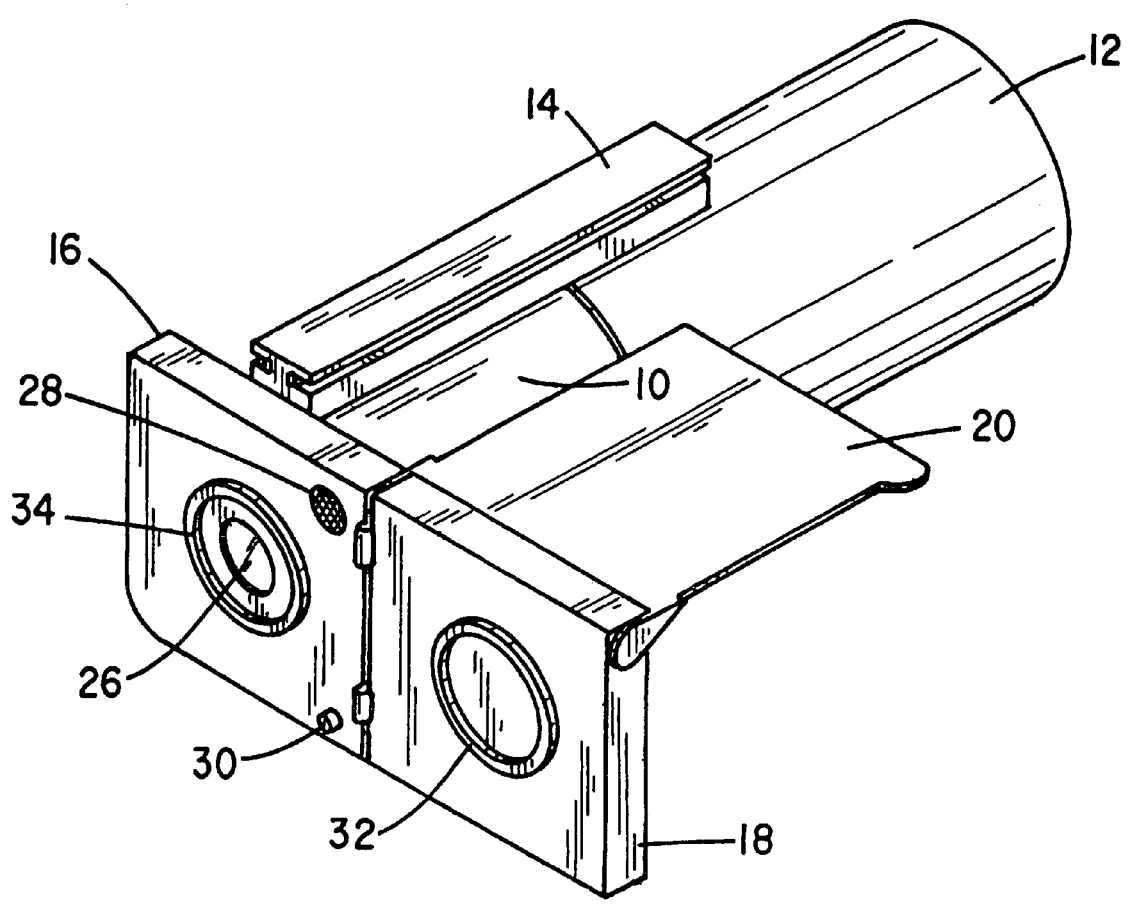
FIG. 2 is a perspective view of the first preferred embodiment of the game hunting video camera in its operational mode.
Figure 3:
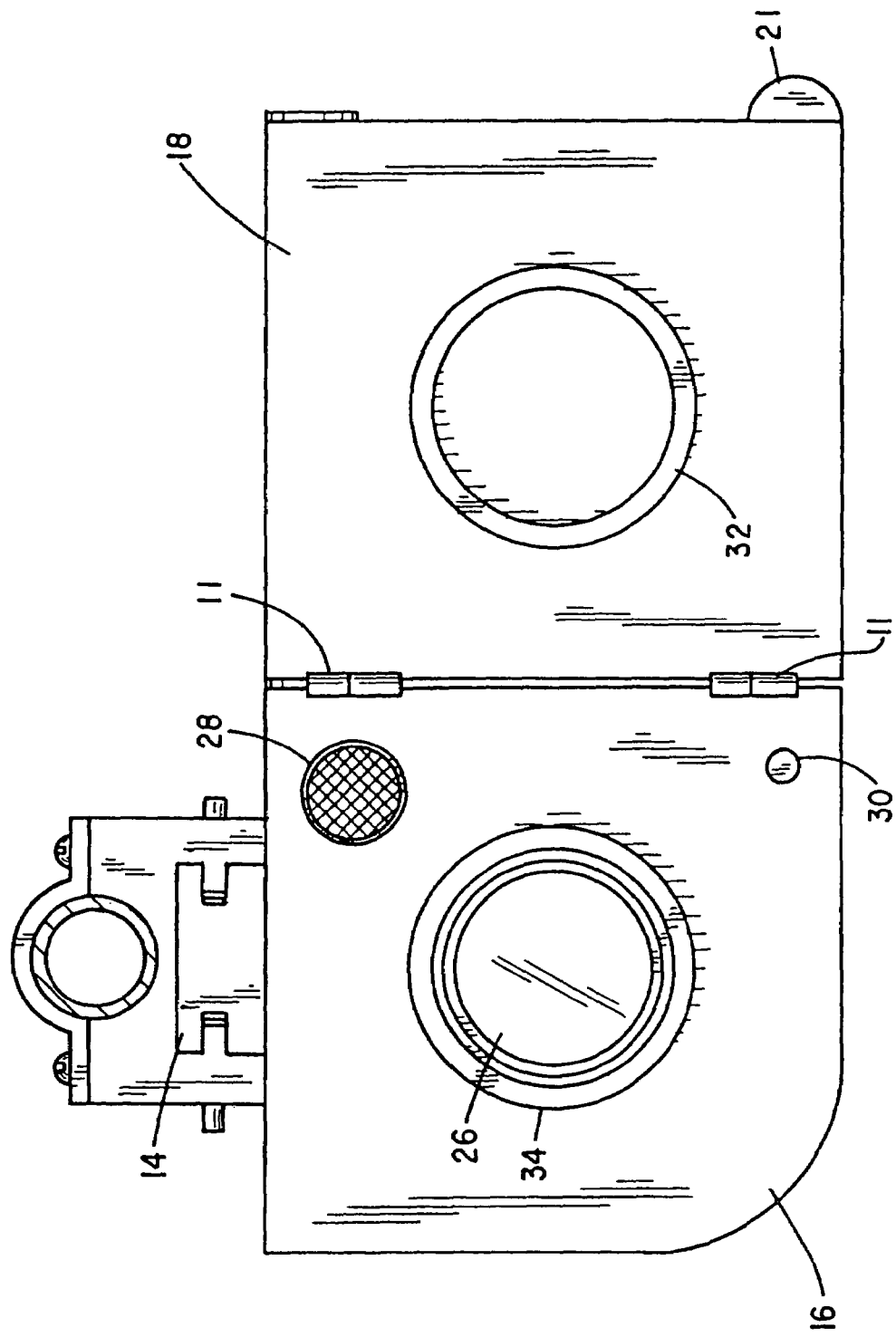
FIG. 3 is a front view of the first preferred embodiment of the game hunting video camera in its operational mode.

My first embodiment of my game hunting video camera invention, in its non-operational mode, is illustrated in FIG. 1. The video camera is shown having a main camera body 10, a camera weather cover 12, a camera base 16, a liquid crystal display housing member 18, a liquid crystal display weather shield 20, a camera mount member 14, a zoom in button 22 and a zoom out button 24. The video camera in its operational mode is illustrated in FIG. 2. FIG. 3 illustrates the front side of the camera base 16. The front side of the camera base 16 contains the lense 26 of the camera, a circular recess portion 34, a front facing microphone 28 for recording the sounds produced by the game and normally closed SPDT push button camera record switch 30 that turns the video camera on and off.

An liquid crystal display housing member 18 is attached by hinges 11 to the camera base 16. When the video camera is in its non-operational transportation mode, the liquid crystal display housing member 18 is rotated on its hinges 11 so it is in front of the camera base 10 as illustrated in FIG. 1. When the liquid crystal display housing member 18 is in this position the normally closed camera record switch 30 is open and the video camera is off. The liquid crystal display housing member 18 is held in this position by a protruding circular semi pliable seal 32 that has one side solidly connected to the liquid crystal display housing member 18 as illustrated in FIG. 3. The other side of the circular semi pliable seal 32 is tightly received in the circular recess 34 located in front of the camera base 16. This seal connection not only keeps the liquid crystal display housing member 18 in the non-operational position, it also protects the lense 26 when the video camera is turned off. This is an important feature because the video camera is likely to be exposed to harsh environments as a hunter pursues his or her game. My design not only protects the lense 26 from scratches, as the hunter makes his or her way through the woods or brush, it also protects the lense from weather conditions.

When the hunter sees game he or she simply rotates the liquid crystal display housing member 18 about its hinges 11. This action closes the camera record switch 30 completing the circuit that starts the video camera recording. The ease and speed in which the video camera is started is very important in a hunting situation because a hunter may not have much time to react when the game is sighted. My design minimizes the time needed to get the video camera recording. In addition, the hinges 11 are tightly bound so that the liquid crystal display housing member 18 is put in a position by the operator it will stay there until the operator once again acts upon it.

Figure 4:
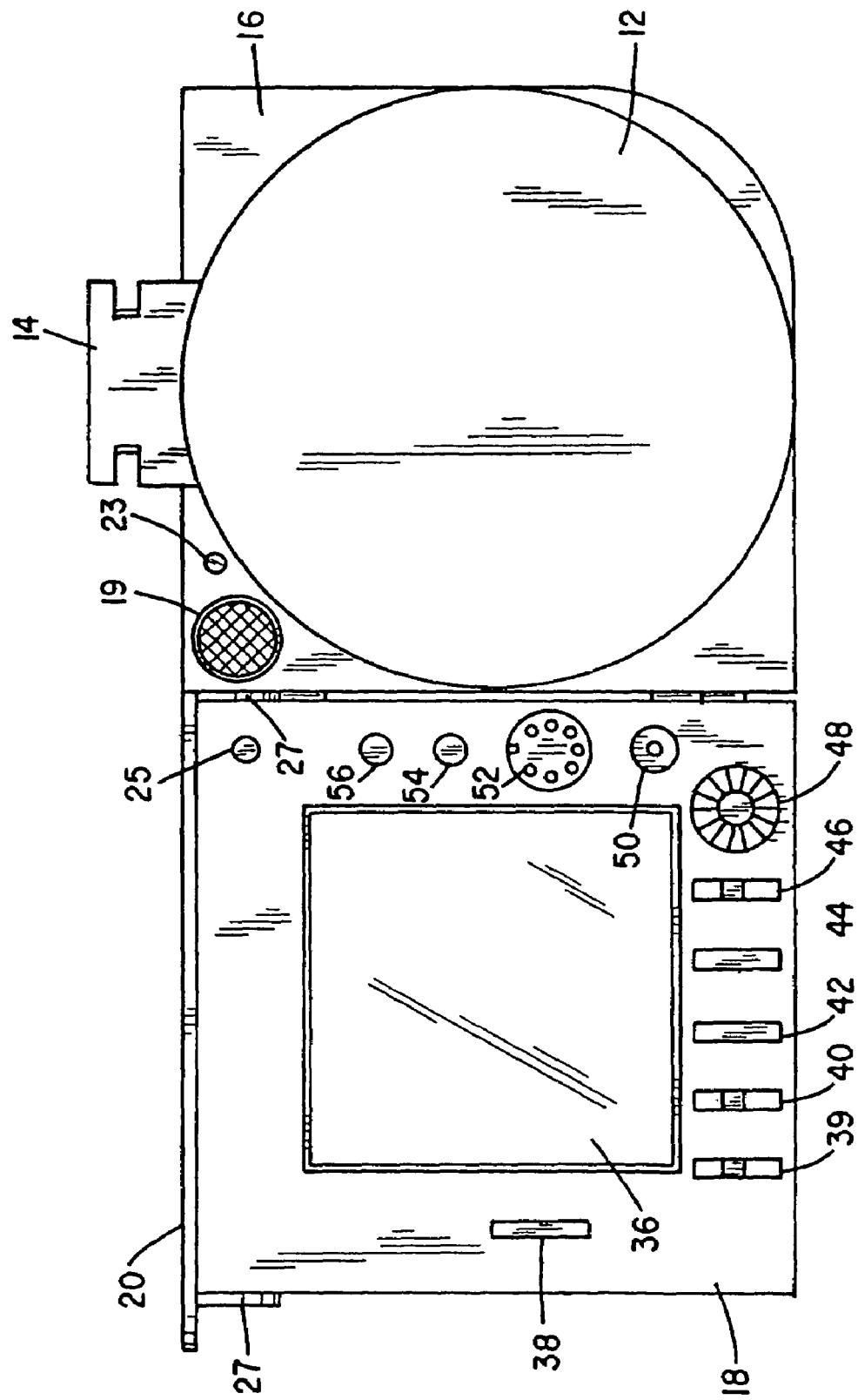
FIG. 4 is a rear view of the first embodiment of the game hunting camera in its operational mode.

The back side of the camera base 16 and the liquid crystal display housing member 18 is illustrated in FIG. 4. A rear microphone 19 is placed on the back side of the camera base 16 for recording the sounds produced by the hunter. The back side of the camera base 16 also has a indicator light 23 that lights up when the video camera is recording. A liquid crystal display 36 is encased in the back side of the liquid crystal display housing member 18. The operation controls of the camera are also placed in the back side of the liquid crystal display housing member 18 around the liquid crystal display 36. The operating controls are common in the art of video cameras and may include the following: a menu control 38, a liquid crystal display brightness control 39, a speaker control 40, an on/off record switch 42, a play control 44, a search control 46, a menu select dial 48, a battery charge connect port 50, a s-video terminal 52, a audio out port 54 and a video out port 56.

A weather shield is connected by pivots 27 on the back side of the liquid crystal display housing member 18 as illustrated in FIG. 4. The liquid crystal display 36 is activated when the liquid crystal display weather shield 20 is rotated in an upward direction. This action closes the normally closed SPST push button liquid crystal display switch 25 activating the liquid crystal display 36. Besides controlling the liquid crystal display switch 25 the liquid crystal display weather shields also shields the liquid crystal display 36 from the weather. In addition, the liquid crystal display weather shield 20 has a liquid crystal display weather shield tab portion 21 that protrudes out beyond the body of the liquid crystal display housing member 18 as illustrated in FIG. 3. This tab portion allows the hunter to quickly flip the liquid crystal display weather shield 20 up to activate the liquid crystal display 36. The pivots 27 are also tightly bound so that when the operator puts the weather shield in a position it will remain there until the operator once again acts upon it.

Figure 7:
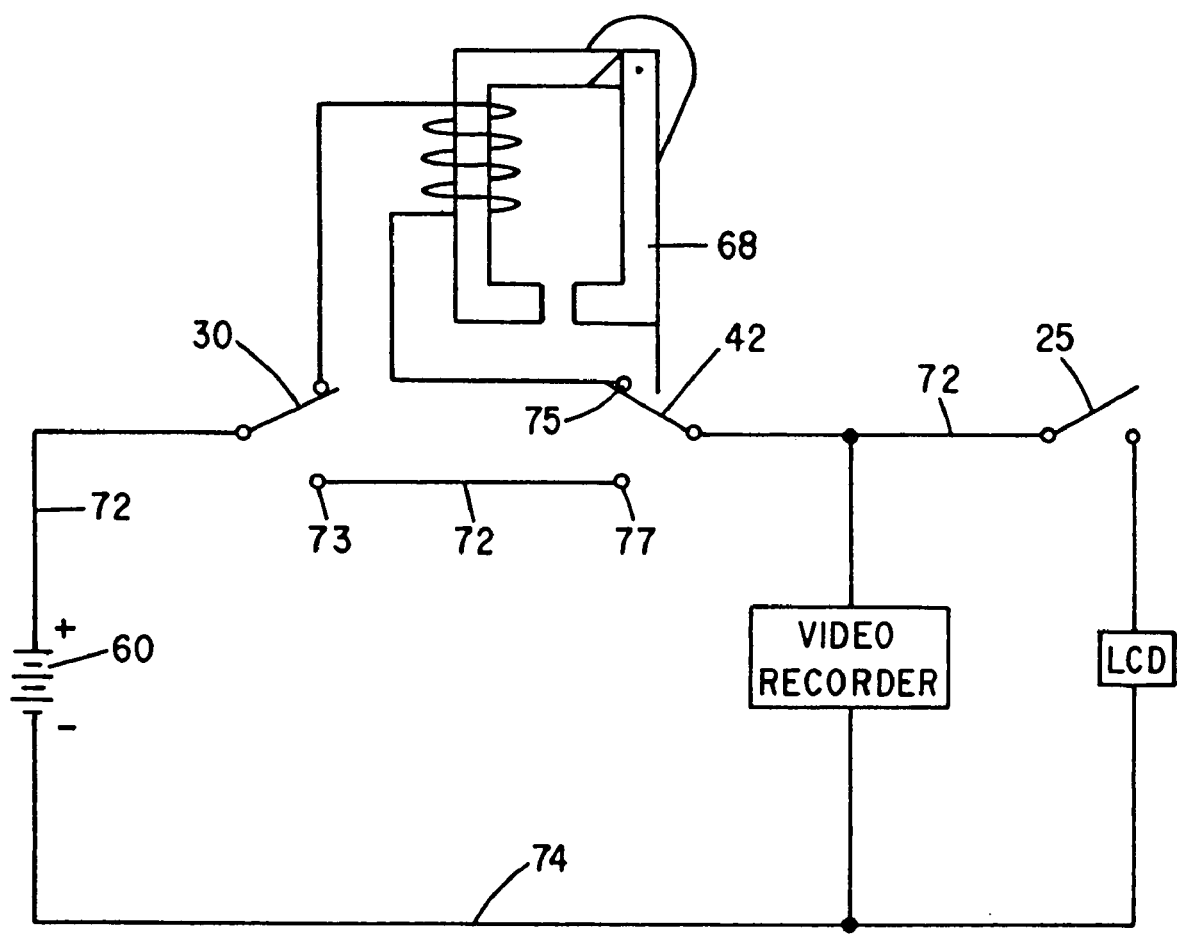
FIG. 7 is a schematic diagram of the circuit that controls the video recorder and the liquid crystal display in the first embodiment of the game hunting video camera.

The circuit that turns the video recorder and the liquid crystal display 36 on and off is an important feature of my invention and is illustrated in FIG. 7. A simplified circuit is shown having a battery source 60, a video recorder portion, a liquid crystal display portion, a relay 68, the camera record switch 30, the on/off record switch 42, the liquid crystal display switch 25, an upper wire 72 and a lower wire 74. The circuit is shown, having the liquid crystal display housing member 18 rotated in front of, and attached to, the camera base 16. Accordingly, the normally closed camera recorder switch 30 is in its open position 71. The circuit is also shown having the on/off switch 42 in its open position 75. If this situation occurs, the relay 68 automatically acts on the on/off record switch 42 switching it to the closed position 77. This ensures that every time the liquid crystal display housing member is rotated to the camera's operational position, the camera starts recording automatically. The operator will not have to waste time manually pushing the on/off record switch 42 on the liquid crystal display housing member 18 to get it in the right position. When the camera recorder switch 30 is in its closed position 73 and the on/off record switch 42 in its closed position 77, the circuit is complete and the video camera starts recording. The liquid crystal display 36 is turned on when the liquid crystal display switch 25 is closed. This occurs when the liquid crystal display weather shield 20 is flipped up.

Figure 5:
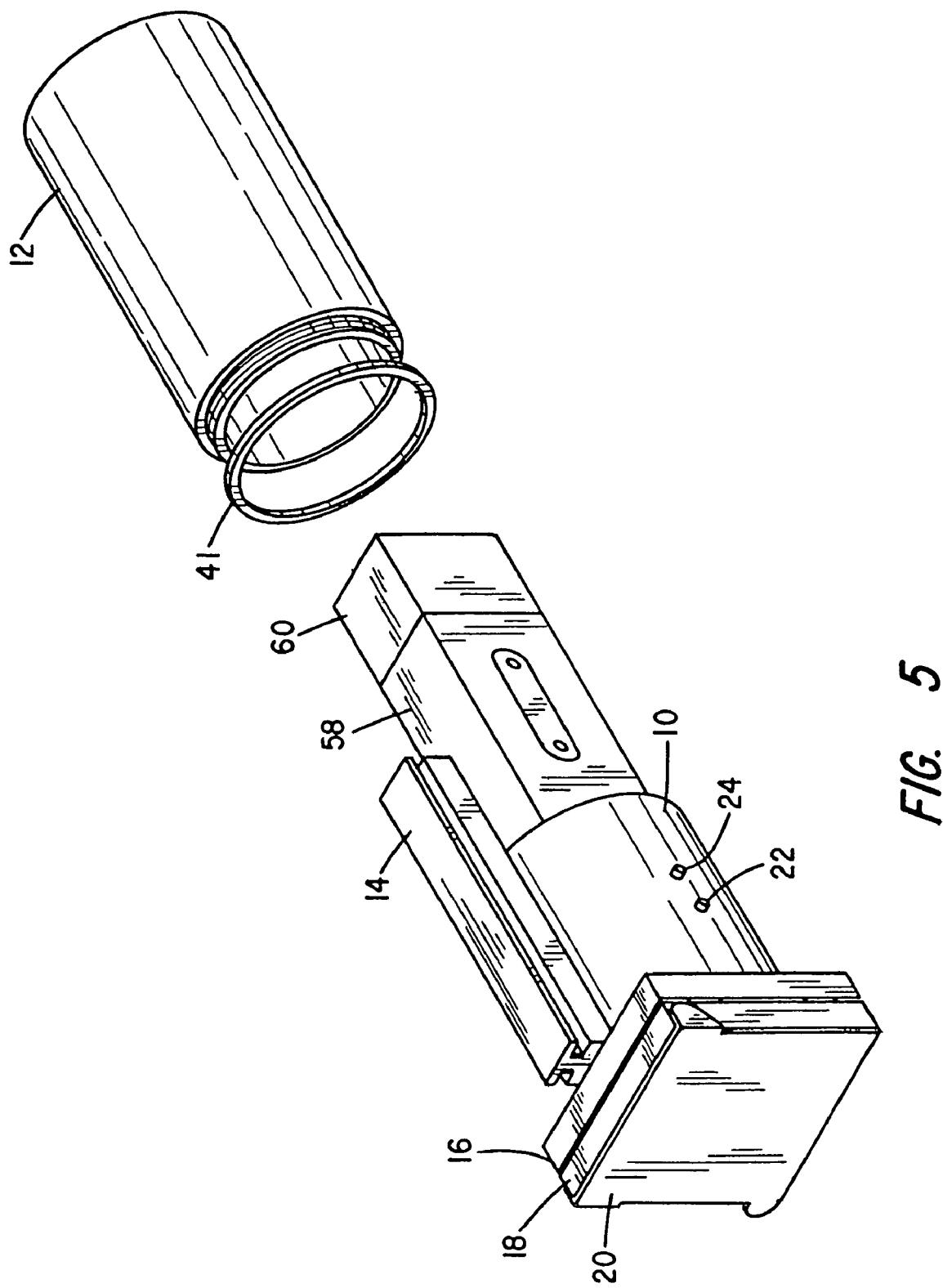
FIG. 5 is a perspective view of the first preferred embodiment illustrating how the cassette drive and battery are accessed.
Figure 6:
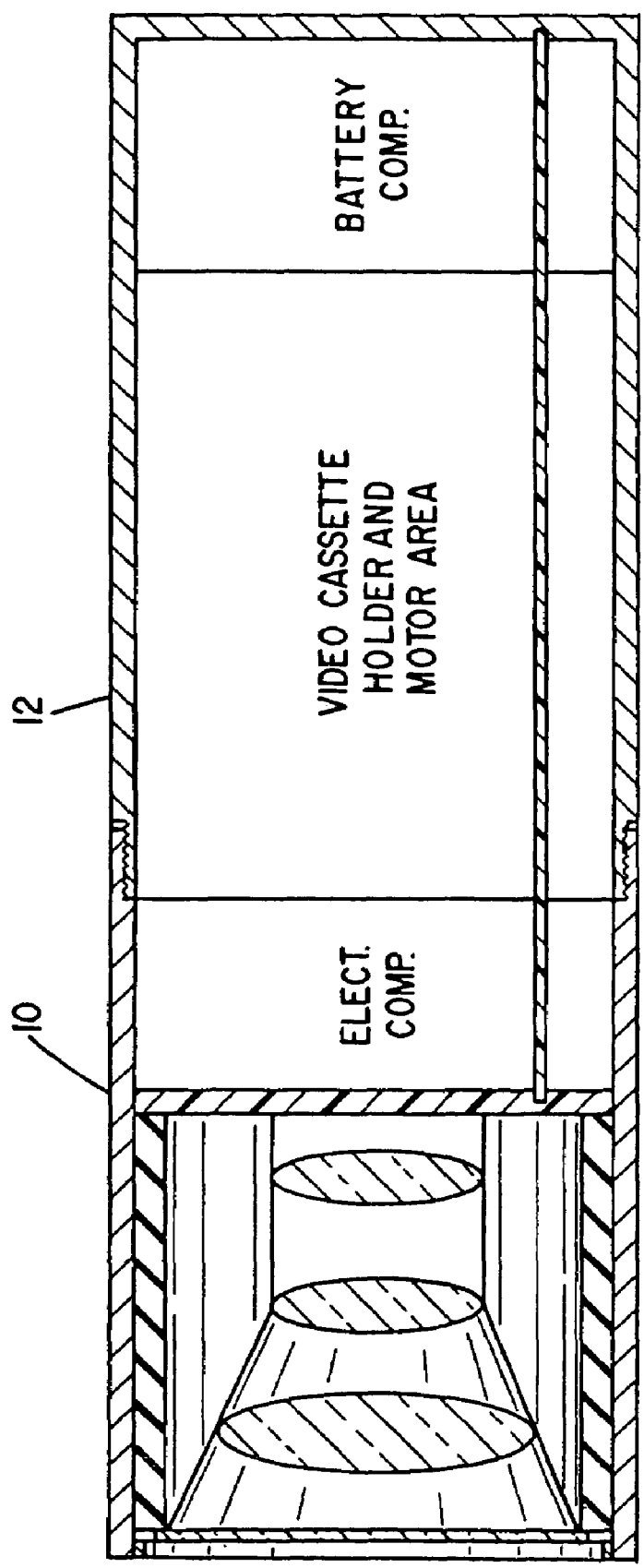
FIG. 6 is a side cross-sectional representation of the components of the game hunting video camera.

My video camera has a cylindrical weather cover 12 that screws onto the main camera base 10. This is illustrated in FIG. 5. As the weather cover 12 is screwed onto the main camera body 10 it comes in contact with a rubber ring 41 thereby sealing the internal components from the weather. The weather cover 12 also provides easy access to the cassette holder 58 and the battery 60. The operator simply has to unscrew the weather cover 12 to put in a video cassette or replace the battery 60. The main camera body 10 is also cylindrical in shape and houses the main components of a standard analog or digital video camera recorder known in the art. These components are illustrated in FIG. 6.

Figure 8:
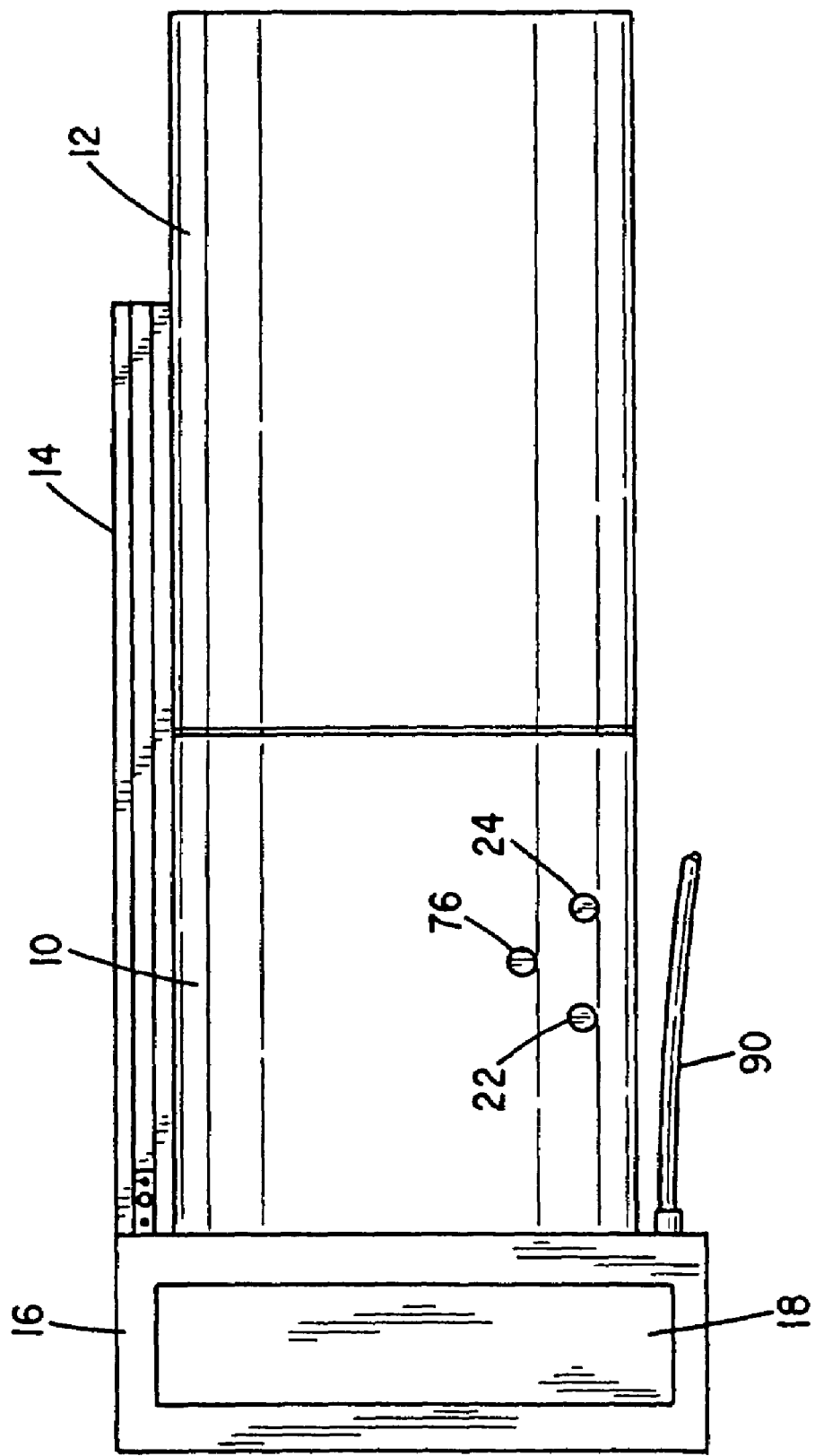
FIG. 8 is a side view of the second embodiment of the game hunting video camera in its non-operation mode.
Figure 9:
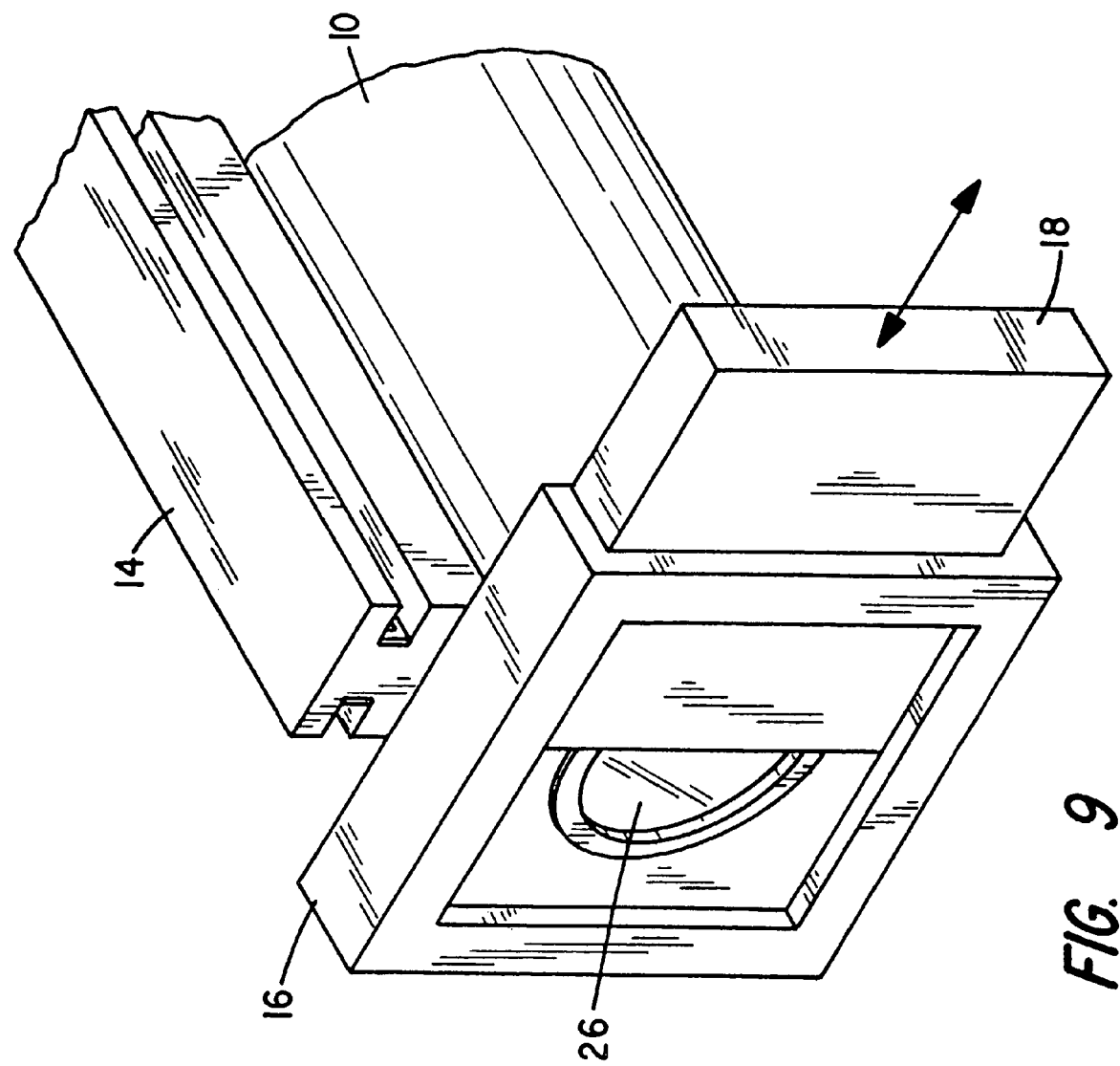
FIG. 9 is a perspective view of the second embodiment of the game hunting video camera illustrating how the LCD housing member moves.
Figure 10:
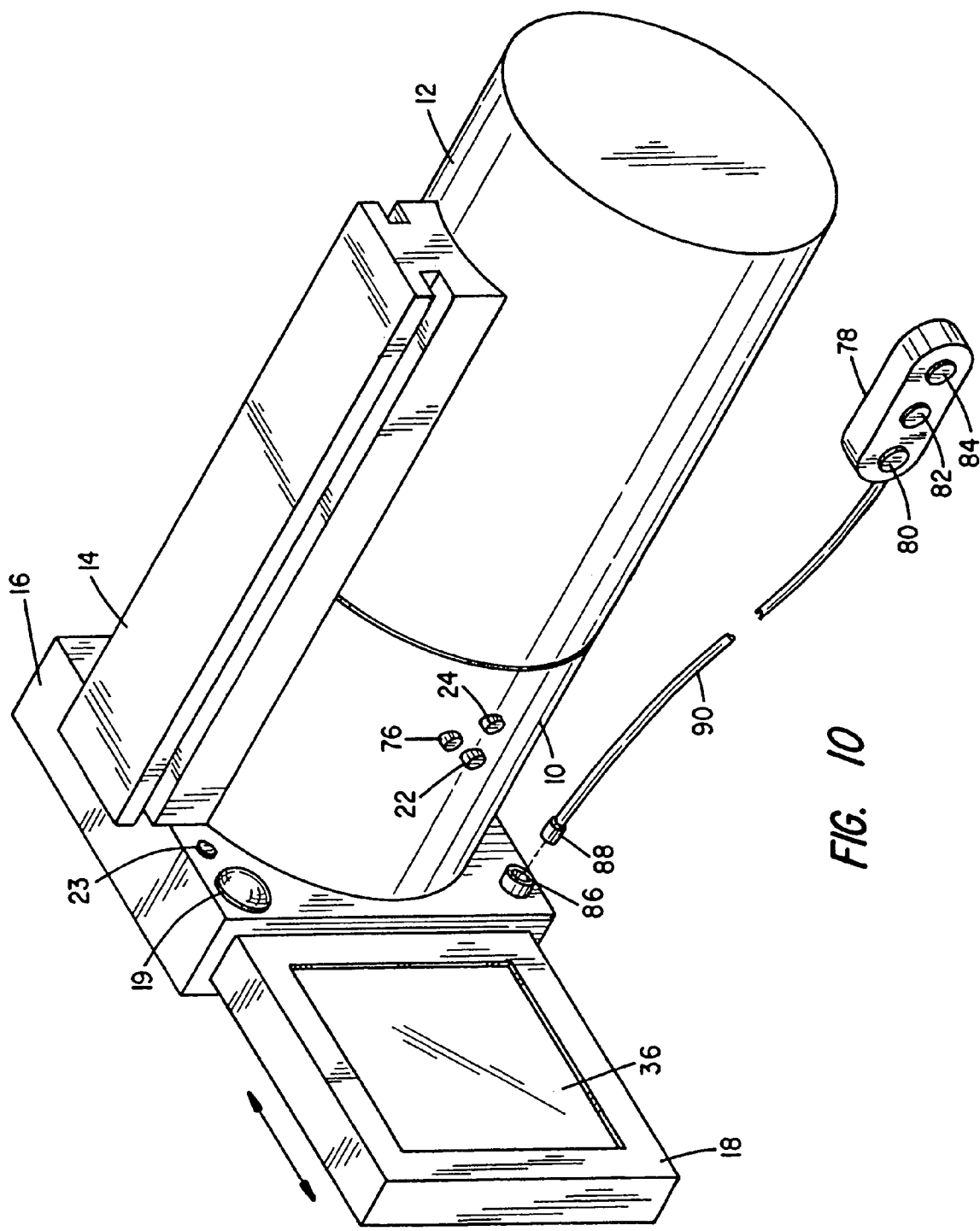
FIG. 10 is a perspective view of the second embodiment of the game hunting video camera in its operational mode.

The second embodiment of my invention is illustrated in FIG. 8. Instead of the operator manually moving the liquid crystal display housing member 18 and the liquid crystal display weather shield 20 to activate the video recorder and the liquid crystal display 36 respectively, this embodiment uses electronic switches. FIG. 8 illustrates the video camera in the non-operational mode. In addition to the zoom in button 22 and the zoom out button 24, the main camera body 10 also has an on/off button 76. When the on/off button 76 is activated the liquid crystal display housing member 18 slides out from the camera base 16 as illustrated in FIG. 9. As in the first embodiment, the liquid crystal display housing member 18 covers and protects the lense 26 when the camera is in its non-operational mode. When the liquid crystal display housing member 18 is fully extended, as illustrated in FIG. 10, the camera automatically starts recording and the liquid crystal display 36 is activated.

This embodiment has a remote port hookup 86 on the camera base 16. A remote pad 78 having a zoom in the button 80, a zoom out button 82 and an on/off button 84 can be attached to the remote port hookup 86, the remote pad 78 becomes operational. This design allows the operator to place the camera controls in a convenient location for optimal efficiency, like the forearm 100 of a firearm or the riser 104 of a bow.

Figure 11:
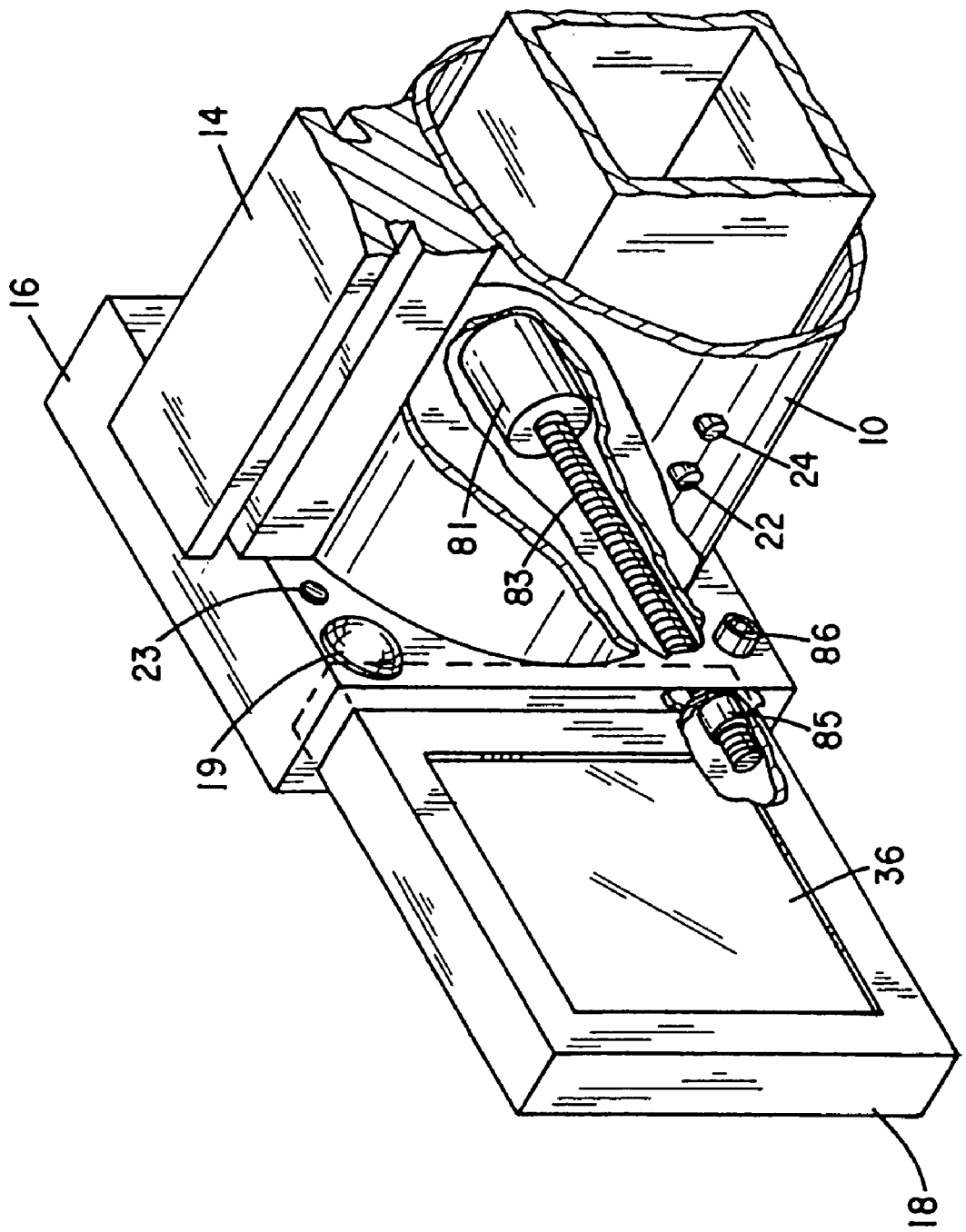
FIG. 11 is a perspective cross-sectional view of the second embodiment of the game hunting video camera illustrating the mechanism that controls LCD housing member.
Figure 12:
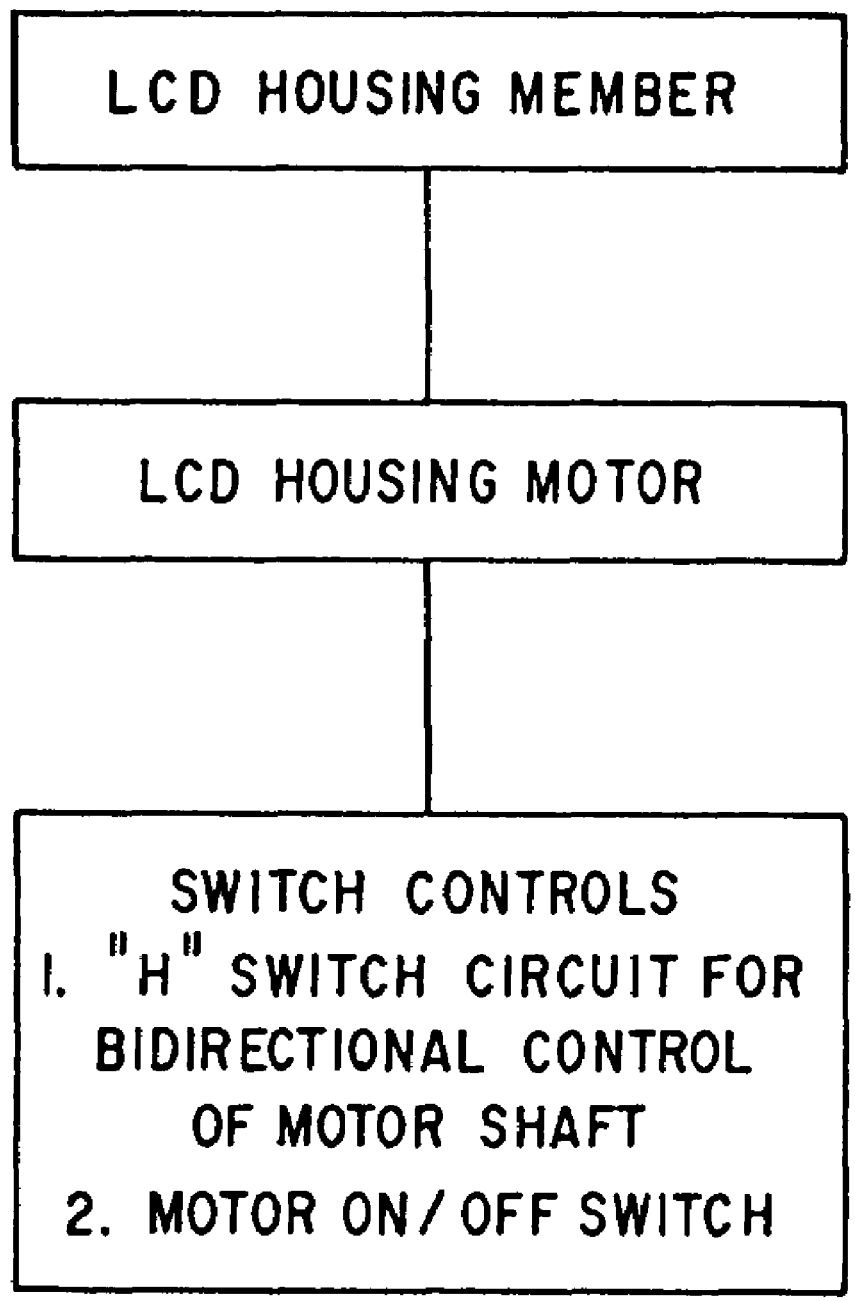
FIG. 12 is a block diagram of the mechanism that controls the movement of the LCD housing member for the second embodiment of the game hunting video camera.

Although, there are equivalent ways, common in the art, to control the movement of the liquid crystal display housing member 18, my preferred method is illustrated in FIG. 11. The liquid crystal display housing motor 81 has threaded shaft 83. The liquid crystal display housing member 18 has an internally threaded insert 85 that is threadably engaged with the threaded shaft 83 of the liquid crystal display housing motor 81. An "H" switch circuit controls the direction that the threaded shaft rotates. When the threaded shaft 83 rotates clockwise the liquid crystal display housing member 18 sides into the camera base 16. When the threaded shaft 83 rotates counter clockwise the liquid crystal display housing member 18 sides out of the camera base 16. The use of this system is common in the art and an example of an "H" switch circuit can be found in U.S. Pat. No. 4,454,454 issued to Valentine entitled Mosfet "H" Switch Circuit for a DC motor. In addition, a block diagram of the system is illustrated in FIG. 12.

Figure 13:
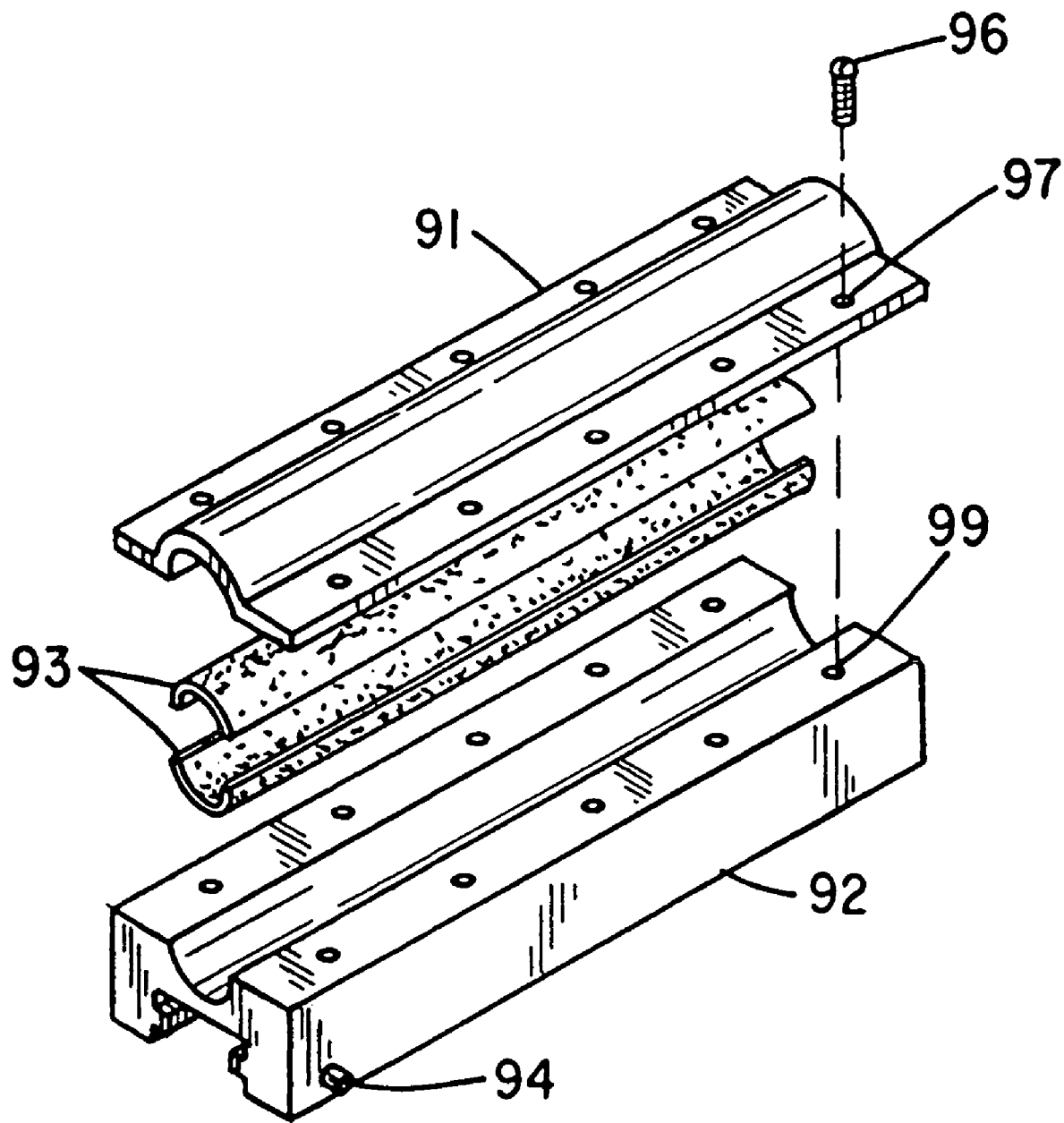
FIG. 13 is an exploded view illustrating the bracket mount system.
Figure 14:
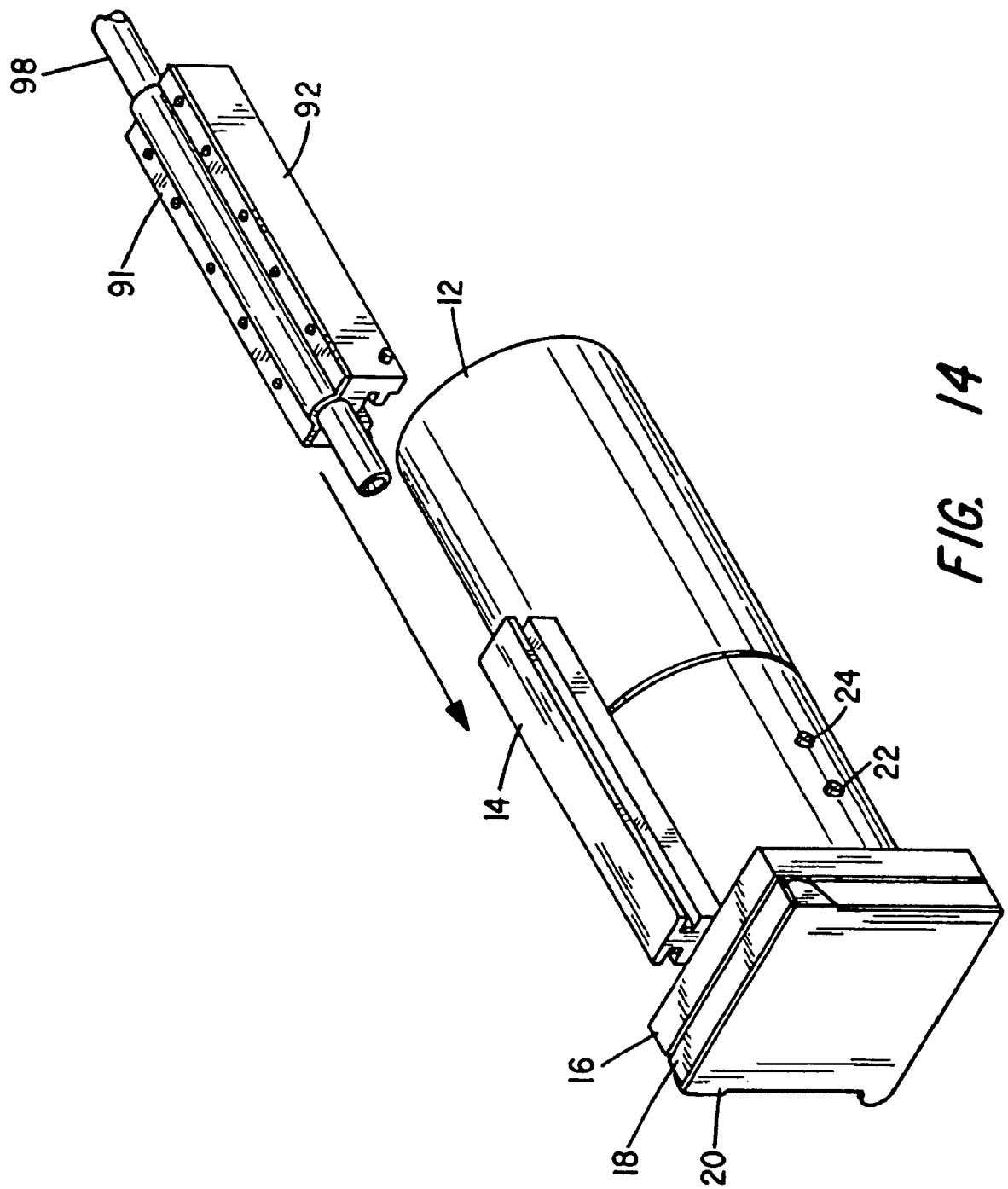
FIG. 14 is a perspective view illustrating how the video camera is mounted on a barrel of a firearm.

A bracket that mounts to a weapon is illustrated in FIG. 13. The upper mount member 91 has a number of screw holes 97. The lower mount member 92 has the same number of threaded screw holes 99. A foam rubber insert 93 covers the inner surface of the upper mount member 91 and the inner surface of the lower mount member 92 to protect the surface of what the mounting bracket is being mounted to. The bracket mounted to a barrel 98 of a firearm is illustrated in FIG. 14. The upper mount member 91 is placed over the top of the barrel 98 of the firearm. The lower mount member 92 is placed under the barrel 98. The screw holes 97 in the upper mount member 91 are then lined up with the threaded screw holes 99 in the lower mount member 92, securing the mounting bracket to the weapon. In addition, the thickness of the foam rubber insert 93 can be changed to accommodate different size barrels 98.

Figure 15:
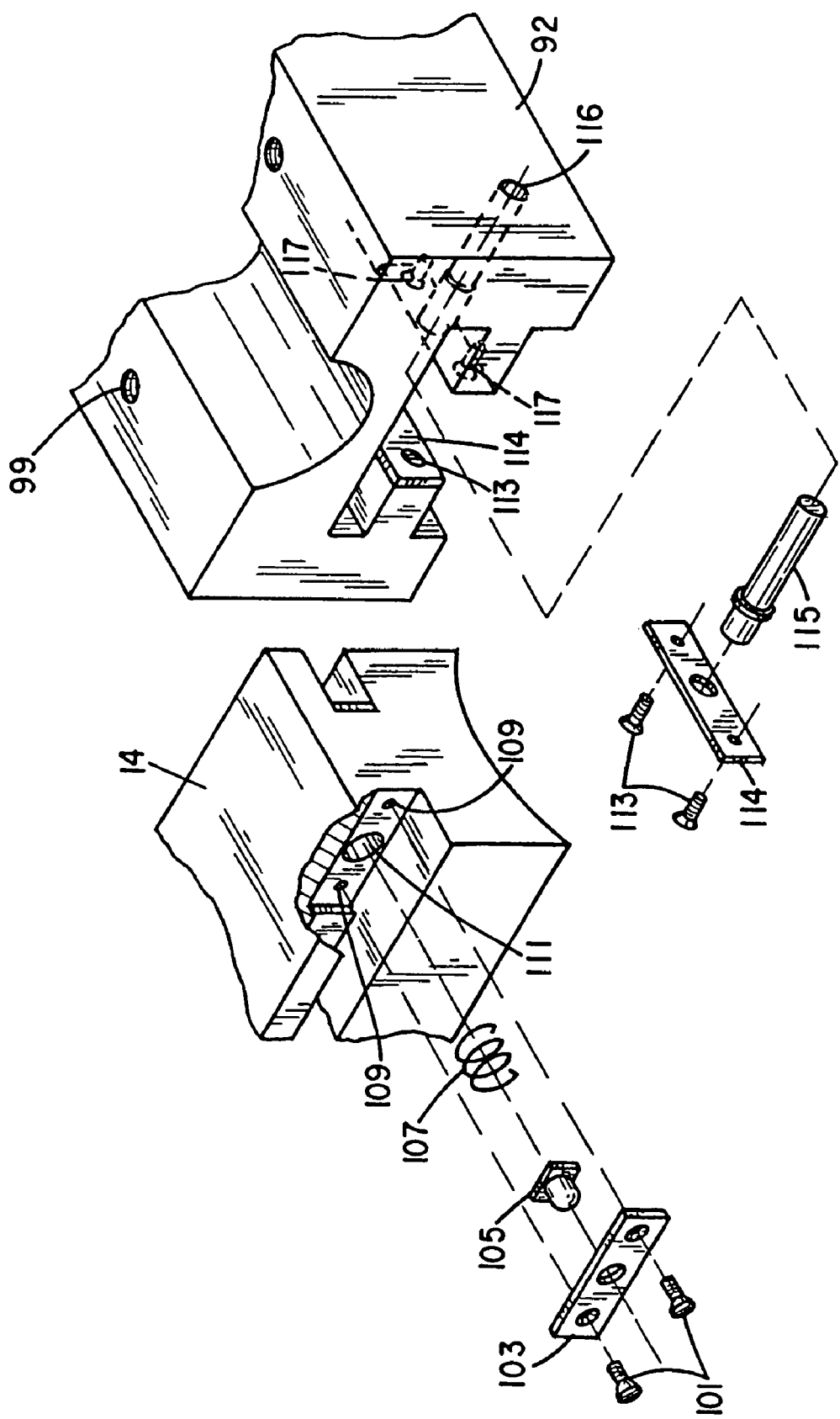
FIG. 15 is an exploded cross-sectional view of the components of the mount system.
Figure 16:
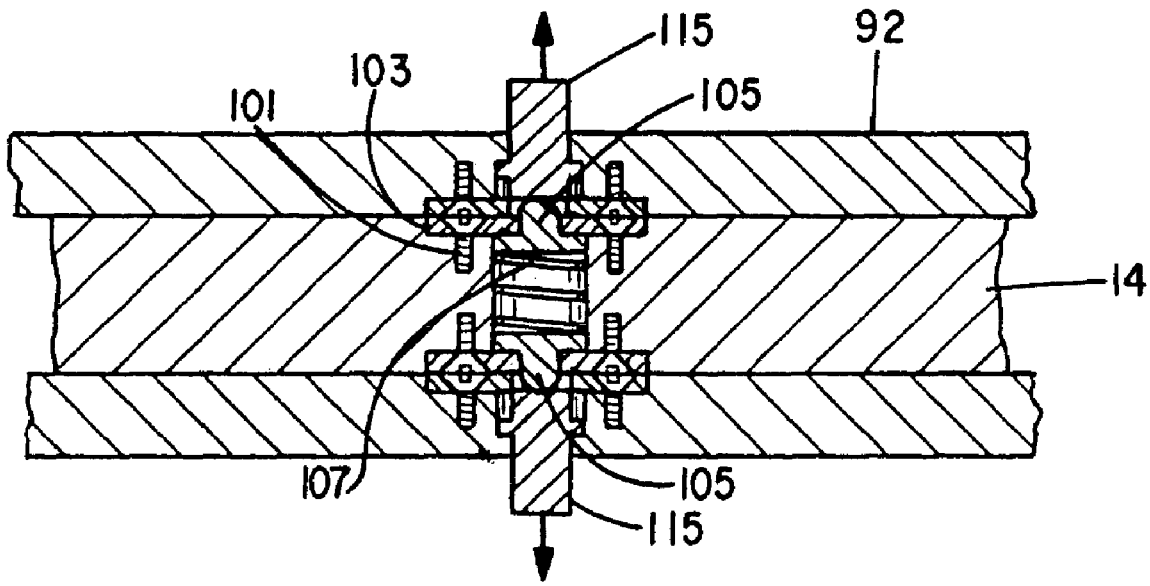
FIG. 16 is a bottom cross-sectional view of the mount system locked in place.
Figure 17:
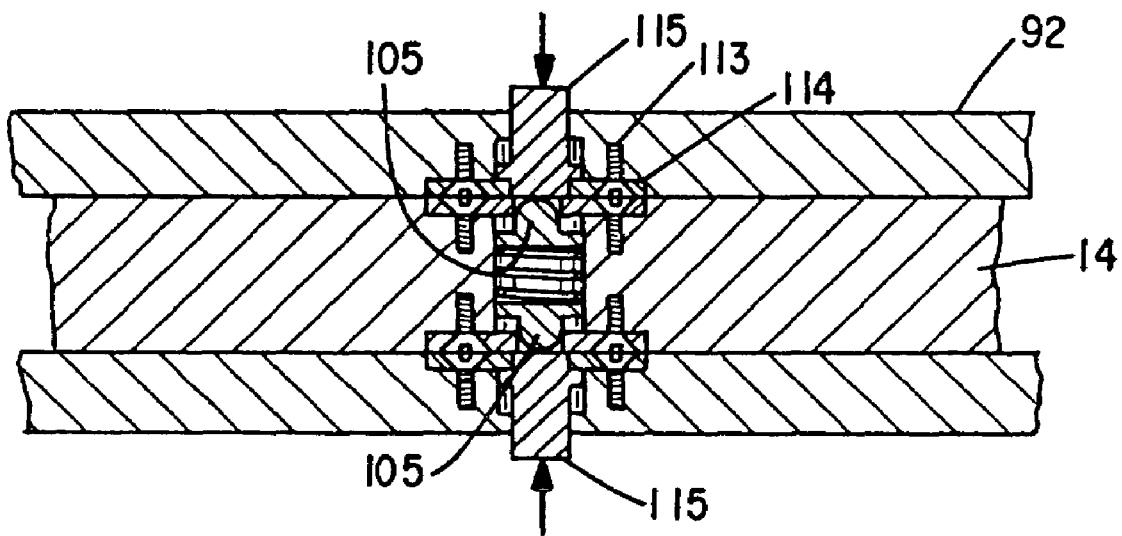
FIG. 17 is a bottom cross-sectional view of the mount system being released by the quick release buttons.

As FIG. 14. illustrates, the video camera is attached to the mounting bracket by sliding the camera mount member 14 into the track of the lower mount member 92. When the camera mount member 14 is positioned far enough into the track of the lower mount member 92 it is locked into place. This is to ensure that the camera will not inadvertently fall off the weapon. The mechanism that locks the camera into place is illustrated in FIGS. 15, 16 & 17. A pair of biasing springs 107 are inserted into cavities 111 in the camera mount member 14. A pair of fastening buttons 105 are then inserted into the cavities 111 engaging the biasing springs 107. The fastening buttons 105 are held in place by a pair of camera mount member plates 103. The camera mount member plates 103 have circular holes that allow the fastening buttons 105 to protrude through them from the force of the biasing spring 107. The camera mount member plates 103 are secured by the camera mount plate screws 101 being screwed into the threaded holes 109 in the camera mount member 14.

A pair of release push buttons 115 are inserted into the push button cavities 116 in the lower mount member 92. The release push buttons 115 are held in place by the mount member plates 114. The mount member plates 114 are secured to the lower mount member 92 by the mount member plates screws 113 being screwed into the threaded screw holes 117. The mount member plates 114 have circular holes in them that are large enough for the fastening buttons 105 to fit through.

FIG. 16 illustrates how the camera mount member 14 locks into place with the lower mount member 92. As the camera mount member 14 slides along the track in the lower mount member 92, the biasing springs 107 assert an outward pressure on the fasting buttons 105. When the fasting buttons 105 encounter the holes in the mount member plates 114 they are forced into them. This action locks the video camera on the mount system. To remove the camera the operator simply presses in on the release push buttons 115. This action forces the fastening buttons 105 out of the holes in the mount member plates 114. This illustrated in FIG. 17. The camera will then slide off the mount effortlessly. Having this simple method of removing the camera is important to the invention because it allows, without undue delay, the use of the camera without it being attached to a weapon.

Figure 18:
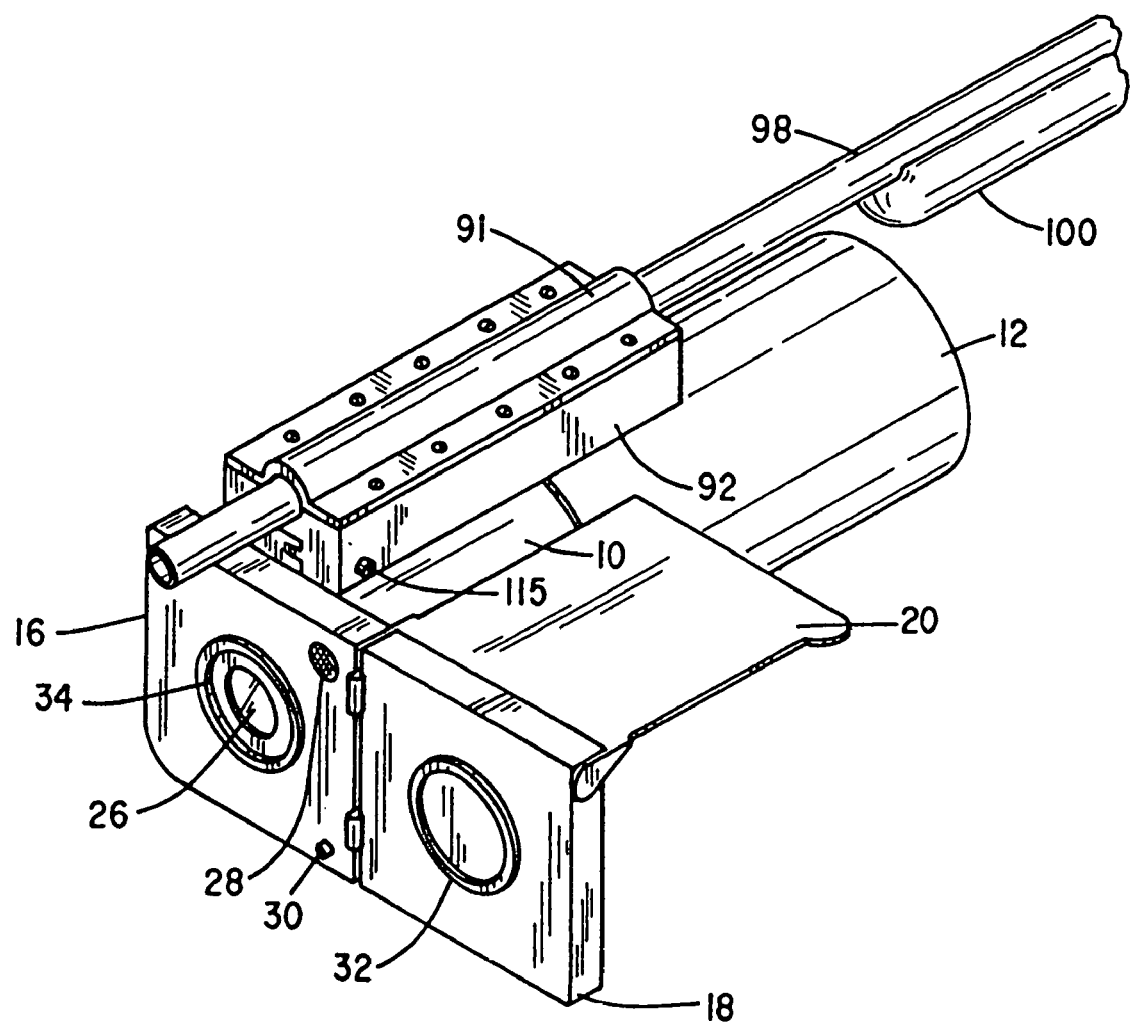
FIG. 18 is a perspective view of the first embodiment of the game hunting video camera mounted on a barrel of a firearm.

The first embodiment of the video camera mounted to the barrel 98 of a firearm is illustrated in FIG. 18. The firearm is shown having a barrel 98 and a forearm 100. One reason for the cylindrical design of the camera body is so it is natural for the operator to use the body of the video camera as he or she would the forearm 100 of the firearm. If the operator does this, his or her thumb will be in a natural position to operate the zoom in button 22 and the zoom out button 24 with little effort or movement. In addition, the remote pad 78 in my second embodiment can be attached to the forearm 100 of the firearm by Velcro, or by some similar fashion, for ease of operation.

Figure 19:
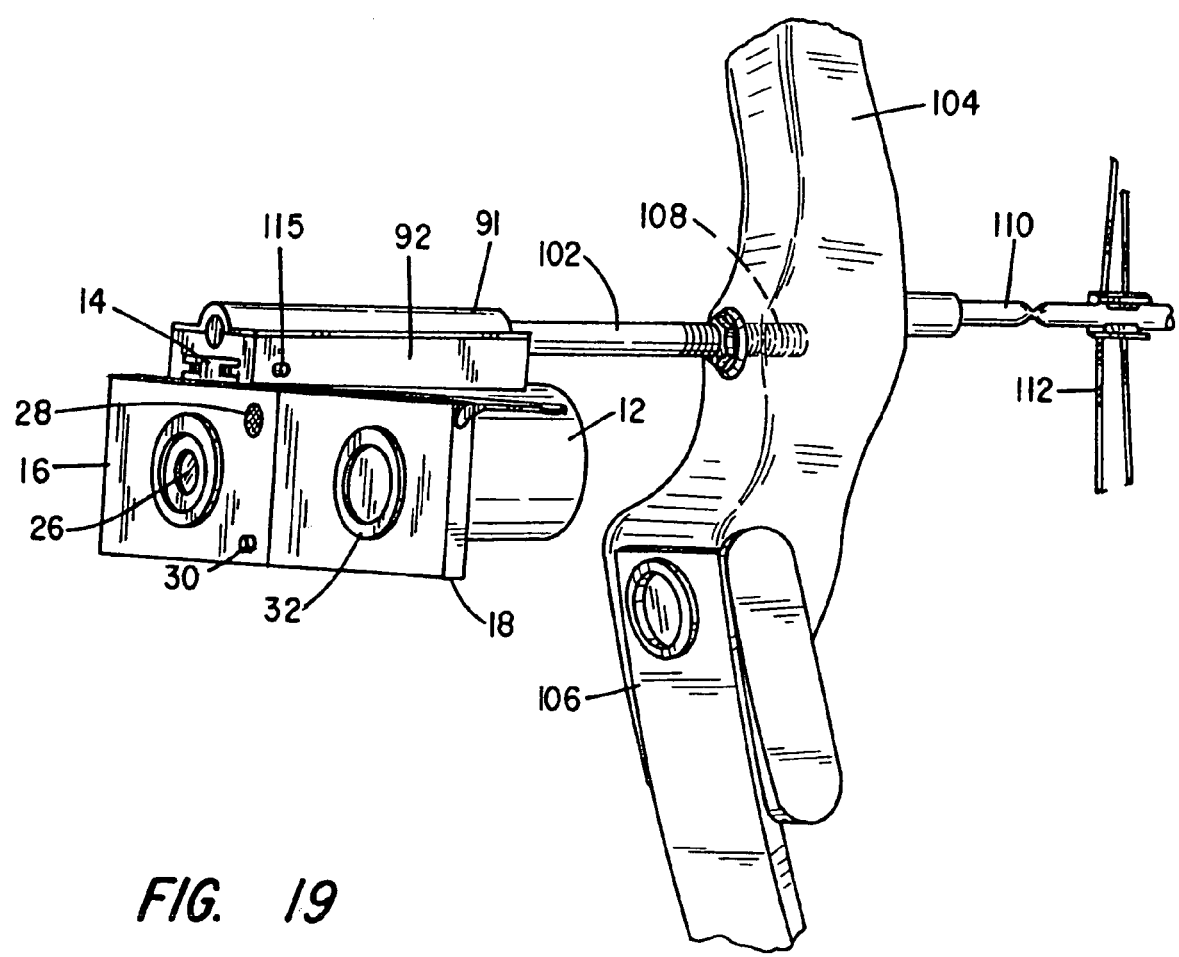
FIG. 19 is a perspective view of the first embodiment of the game hunting video camera mounted on a bow.

The first embodiment of my invention mounted to a bow is illustrated in FIG. 19. The bow is shown having a riser 104, a flexible bow element 106, a cable guard 110, bow string 112, an internally threaded metal insert 108 is shown having the counter weight bar 102 threadably attached. A counter weight bar 102 is used to stabilize the bow when the bow string 112 is drawn back. The mounting bracket is attached to the counter weight bar 102 the same way it is attached to the barrel 98 of a firearm. In addition, the thickness of the foam rubber insert 93 in the mounting bracket can be changed to accommodate the diameter of the counter weight bar 102. Moreover, the remote pad 78 in my second embodiment can be attached to the riser 104 of the bow by Velcro, or by some similar fashion, for ease of operation.

I have designed a game hunters video camera that overcomes the limitations of a prior art. My video camera is designed for hunting situations where the ease of the use and ability to function properly and quickly in extreme situations and weather conditions are paramount to filming the hunting experience. Although, alternative embodiments and modifications are contemplated, I have disclosed my preferred embodiments. In addition, changes and alterations may be made to my preferred embodiments without departing from the spirit of and scope of my invention, as defined by the following claims.

The invention claimed is:

1. A camera comprising:
   a) a display;
   b) a display housing having a front side and back side, the display being encased in the back side of the display housing;
   c) a main camera body having a front end and a back end, the display housing being movably connected to the main camera body;
   d) a camera lens of a given diameter encased in the front end of the main camera body;
   e) the display housing having first and second positions relative to the camera lens, wherein in the first position the display housing covers the lens and in the second position the lens is exposed; and
   f) a camera mount member adapted to couple the main camera body to a bow or firearm.

2. The camera of claim 1, wherein the display is a liquid crystal display.

3. The camera of claim 1, wherein display housing slidably moves between the first and second positions.

4. The camera of claim 1, wherein the display housing pivotally moves between the first and second positions.

5. The camera of claim 1, wherein the display housing hingedly moves between the first and second positions.

6. The camera of claim 1, wherein the display housing further comprising a weather shield.

7. The camera of claim 1, wherein the display is unexposed when the display housing is in the first position and exposed when the display housing is in the second position.

8. The camera of claim 1, wherein when the display housing is in the first position the display is adjacent the lens; and when the display housing is in the second position the display is viewable.

9. A camera comprising:
   a) a main camera body;
   b) a lens received in the main camera body;
   c) a display housing movably coupled to the main camera body to selectively cover and uncover the lens;
   d) a display received in the display housing to display images received by the lens; and
   e) a camera mount member adapted to couple the main camera body to a bow or firearm.

10. The camera as in claim 9, wherein when the display housing is positioned to uncover the lens a microphone located near the lens is also exposed.

11. The camera of claim 9, wherein the display housing is adapted to be positionable in a first and a second position relative to the lens.

12. The camera of claim 11, wherein the display housing moves from a first and second position via an electric motor.

13. The camera of claim 11, wherein the display housing covers the lens when in the first position and exposes the lens when in the second position.

14. The camera of claim 11, wherein the display housing covers the lens and the display is unexposed when in the first position and when the display housing is in the second position the lens is exposed and the display is viewable.

15. The camera of claim 11, wherein in the second position the display in the display housing faces approximately in the opposite direction as the lens.

16. The camera of claim 11, wherein at least one control proximate the display in the display housing is operation when the display housing is in the second position.

17. The camera of claim 11, wherein the display housing is hingedly attached to the main camera body such that in the first position the display housing covers the lens and the display is covered by a weather shield; and further wherein the display housing in the second position is approximately 180 degrees from the first position such that the lens is uncovered and the display side of the display housing faces in the opposite direction as the lens.

18. The camera of claim 11, wherein the display housing is pivotally attached to the main camera body such that in the first position the display housing covers the lens and the display side of the display housing is adjacent the lens; further wherein the display housing in the second position is pivoted approximately 180 degrees such that the lens and display are exposed and the display faces approximately in the opposite direction as the lens.

19. The camera of claim 11, wherein the display housing is slidably attached to the main camera body such that in the first position the display housing covers the lens and the display side of the display housing is adjacent the lens; and further wherein in the second position the display housing is slid to uncover the lens and exposes the lens and the display.

20. A camera lens and display apparatus comprising:
   a) a lens to receive images received in a camera body;
   b) a display to display the received images;
   c) a display housing, the display received in the display housing, the display housing movably coupled to the camera body to selectively cover and protect the lens and the display; and
   d) a camera mount member adapted to couple the main camera body to a bow or firearm.

21. The camera lens and display apparatus of claim 20, wherein the display housing has a first position and a second position in relation to the lens, further wherein in the first position the display housing covers the lens.

22. The camera lens and display apparatus of claim 21, further wherein when the display housing is in the second position the lens is uncovered.

23. The camera lens and display apparatus of claim 21, wherein the lens and the display are operational in the second position.

* * * * *

UNITED STATES PATENT AND TRADEMARK OFFICE
CERTIFICATE OF CORRECTION

PATENT NO. : 7,619,676 B2
APPLICATION NO. : 10/804548
DATED : November 17, 2009
INVENTOR(S) : Larry Holmberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1634 days.

Signed and Sealed this

Twenty-sixth Day of October, 2010

David J. Kappos
*Director of the United States Patent and Trademark Office*